United States Patent
Grover

(10) Patent No.: US 11,722,715 B2
(45) Date of Patent: *Aug. 8, 2023

(54) CONTENT-MODIFICATION SYSTEM WITH MULTIPLE VIDEO BUFFERS FEATURE

(71) Applicant: Roku, Inc., San Jose, CA (US)

(72) Inventor: Matthew George Grover, Cardiff (GB)

(73) Assignee: ROKU, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/828,623

(22) Filed: May 31, 2022

(65) Prior Publication Data

US 2022/0295123 A1 Sep. 15, 2022

Related U.S. Application Data

(63) Continuation of application No. 16/951,180, filed on Nov. 18, 2020, now Pat. No. 11,381,855.

(51) Int. Cl.
| | |
|---|---|
| *H04N 21/236* | (2011.01) |
| *H04N 21/647* | (2011.01) |
| *H04N 21/462* | (2011.01) |
| *H04N 21/434* | (2011.01) |
| *H04N 21/2365* | (2011.01) |

(52) U.S. Cl.
CPC ... *H04N 21/2365* (2013.01); *H04N 21/23614* (2013.01); *H04N 21/4348* (2013.01); *H04N 21/4621* (2013.01); *H04N 21/647* (2013.01)

(58) Field of Classification Search
CPC ......... H04N 21/2365; H04N 21/23614; H04N 21/4348; H04N 21/4621; H04N 21/647
USPC .................................................. 375/240.26
See application file for complete search history.

(56) References Cited

U.S. PATENT DOCUMENTS

| | | |
|---|---|---|
| 6,698,020 B1 | 2/2004 | Zigmond et al. |
| 8,561,104 B1 | 10/2013 | Dow et al. |
| 10,237,195 B1 | 3/2019 | Karach et al. |
| (Continued) | | |

OTHER PUBLICATIONS

International Searching Authority, International Search Report and Written Opinion dated Mar. 21, 2022, issued in connection with International Application No. PCT/US2021/059185.

*Primary Examiner* — Dominic D Saltarelli
(74) *Attorney, Agent, or Firm* — Sterne, Kessler, Goldstein & Fox P.L.L.C.

(57) ABSTRACT

In one aspect, a method includes transmitting a request for supplemental content for use by a content-presentation device that is scheduled to perform a content-modification operation at a start-time and, in response to the request: receiving, into a first buffer of the content-presentation device, first supplemental content having a first video quality that is higher than or equal to a predefined threshold, and receiving, into a second, different buffer of the content-presentation device, second supplemental content having a second video quality lower than the predefined threshold. The method also includes within a predefined time period before the start-time, determining whether an entirety of the first supplemental content has been received into the first buffer. The method also includes based on the determination, selecting supplemental content from a set of supplemental content that includes the first and second supplemental content, and performing the content-modification operation using the selected supplemental content.

20 Claims, 10 Drawing Sheets

(56) References Cited

U.S. PATENT DOCUMENTS

| | | |
|---|---|---|
| 2009/0187957 A1 | 7/2009 | Avkarogullari |
| 2010/0205049 A1 | 8/2010 | Long et al. |
| 2010/0218227 A1 | 8/2010 | Frink et al. |
| 2013/0227122 A1 | 8/2013 | Gao et al. |
| 2015/0206542 A1 | 7/2015 | Gilson |
| 2015/0244833 A1 | 8/2015 | Grue et al. |
| 2015/0271235 A1 | 9/2015 | Zanger et al. |
| 2015/0326896 A1* | 11/2015 | Su .................... H04N 21/23406 375/240.26 |
| 2016/0105724 A1 | 4/2016 | Bloch et al. |
| 2016/0165307 A1 | 6/2016 | Lavender et al. |
| 2017/0070789 A1 | 3/2017 | Liassides et al. |
| 2017/0134465 A1 | 5/2017 | Caballero et al. |
| 2017/0289591 A1 | 10/2017 | Blohowiak et al. |
| 2018/0007395 A1* | 1/2018 | Ugur ................ H04N 21/21805 |
| 2020/0359089 A1 | 11/2020 | Ashbacher et al. |
| 2022/0038791 A1 | 2/2022 | Curcio et al. |

\* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | | |
|---|---|---|---|---|---|---|
| T9 | | | Compare first fingerprint data and second fingerprint data | | | |
| T10 | | | Detect a match between first fingerprint data and second fingerprint data | | | |
| T11 | | | Identify the channel on which the second content is being received | | | |
| T12 | | | Generate metadata associated with the identified channel | | | |
| T13 | | | Transmit an indication of the identified channel and the associated metadata | | | |
| T14 | | | | | | Receive the indication of the identified channel and the associated metadata |

Figure 4B

| | | | | | | | | | |
|---|---|---|---|---|---|---|---|---|---|
| T15 | | | | | | | | | Determine historical content consumption data |
| T16 | Transmit third content | | | | | | | | |
| T17 | | Generate third fingerprint data and third metadata | | | | | | | |
| T18 | | Transmit third fingerprint data and third metadata | | | | | | | |
| T19 | | | | | Receive modifiable content segment | | | | |
| T20 | | | | | | Generate fourth fingerprint data and fourth metadata | | | |
| T21 | | | | | | Transmit fourth fingerprint data and fourth metadata | | | |
| T22 | | | | Receive third fingerprint data and third metadata | | | | | |
| T23 | | | | Receive fourth fingerprint data and fourth metadata | | | | | |

Figure 4C

| | | | | | | |
|---|---|---|---|---|---|---|
| T24 | Compare at least a portion of third fingerprint data and at least a portion of fourth fingerprint data | | | | | |
| T25 | Detect a match between at least a portion of third fingerprint data and at least a portion of fourth fingerprint data | | | | | |
| T26 | Identify an upcoming content modification opportunity on the identified channel | | | | | |
| T27 | Transmit the third fingerprint data and the third metadata | | | | | |
| T28 | | Receive third fingerprint data and third metadata | | | | |
| T29 | | Receive fifth content | | | | |
| T30 | | Output for presentation fifth content | | | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | Receive request and select supplemental content | | | | | |
| T37 | | Transmit request for link | | | | | |
| T38 | | | | | | | Transmit link |

Figure 4E

|  | Transmit link |  |  |  |
|---|---|---|---|---|
| T39 | | | | |
| T40 | Receive link and retrieve supplemental content | | | |
| T41 | Perform content modification operation | | | |

Figure 4F

CONTENT-MODIFICATION SYSTEM WITH MULTIPLE VIDEO BUFFERS FEATURE

RELATED DISCLOSURES

This disclosure is a continuation of U.S. patent application Ser. No. 16/951,180, filed Nov. 18, 2020, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method is disclosed. The method includes transmitting a request for supplemental content for use by a content-presentation device in performing a content-modification operation, where the content-modification operation comprises modifying a modifiable content-segment received by the content-presentation device, and where the content-presentation device is scheduled to perform the content-modification operation at a modification start-time. The method also includes in response to the request: receiving, into a first input buffer of the content-presentation device, first supplemental content having a first video quality that is higher than or equal to a predefined video quality threshold, and receiving, into a second input buffer of the content-presentation device, second supplemental content having a second video quality that is lower than the predefined video quality threshold, where the second input buffer is different from the first input buffer. The method also includes within a predefined time period before the modification start-time, making a determination of whether an entirety of the first supplemental content has been received into the first input buffer. The method also includes based on the determination, selecting supplemental content from a set of supplemental content that includes the first supplemental content and the second supplemental content. The method also includes performing the content-modification operation by modifying the modifiable content-segment using the selected supplemental content.

In another aspect, a non-transitory computer-readable storage medium has stored thereon program instructions that, upon execution by a processor, cause performance of a set of operations. The set of operations includes transmitting a request for supplemental content for use by a content-presentation device in performing a content-modification operation, where the content-modification operation comprises modifying a modifiable content-segment received by the content-presentation device, and where the content-presentation device is scheduled to perform the content-modification operation at a modification start-time. The set of operations also includes in response to the request: receiving, into a first input buffer of the content-presentation device, first supplemental content having a first video quality that is higher than or equal to a predefined video quality threshold, and receiving, into a second input buffer of the content-presentation device, second supplemental content having a second video quality that is lower than the predefined video quality threshold, where the second input buffer is different from the first input buffer. The set of operations also includes within a predefined time period before the modification start-time, making a determination of whether an entirety of the first supplemental content has been received into the first input buffer. The set of operations also includes based on the determination, selecting supplemental content from a set of supplemental content that includes the first supplemental content and the second supplemental content. The set of operations also includes performing the content-modification operation by modifying the modifiable content-segment using the selected supplemental content.

In another aspect, a computing system includes a processor and a non-transitory computer-readable storage medium, having stored thereon program instructions that, upon execution by the processor, cause performance of a set of operations. The set of operations includes transmitting a request for supplemental content for use by a content-presentation device in performing a content-modification operation, where the content-modification operation comprises modifying a modifiable content-segment received by the content-presentation device, and where the content-presentation device is scheduled to perform the content-modification operation at a modification start-time. The set of operations also includes in response to the request: receiving, into a first input buffer of the content-presentation device, first supplemental content having a first video quality that is higher than or equal to a predefined video quality threshold, and receiving, into a second input buffer of the content-presentation device, second supplemental content having a second video quality that is lower than the predefined video quality threshold, where the second input buffer is different from the first input buffer. The set of operations also includes within a predefined time period before the modification start-time, making a determination of whether an entirety of the first supplemental content has been received into the first input buffer. The set of operations also includes based on the determination, selecting supplemental content from a set of supplemental content that includes the first supplemental content and the second supplemental content. The set of operations also includes performing the content-modification operation by modifying the modifiable content-segment using the selected supplemental content.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
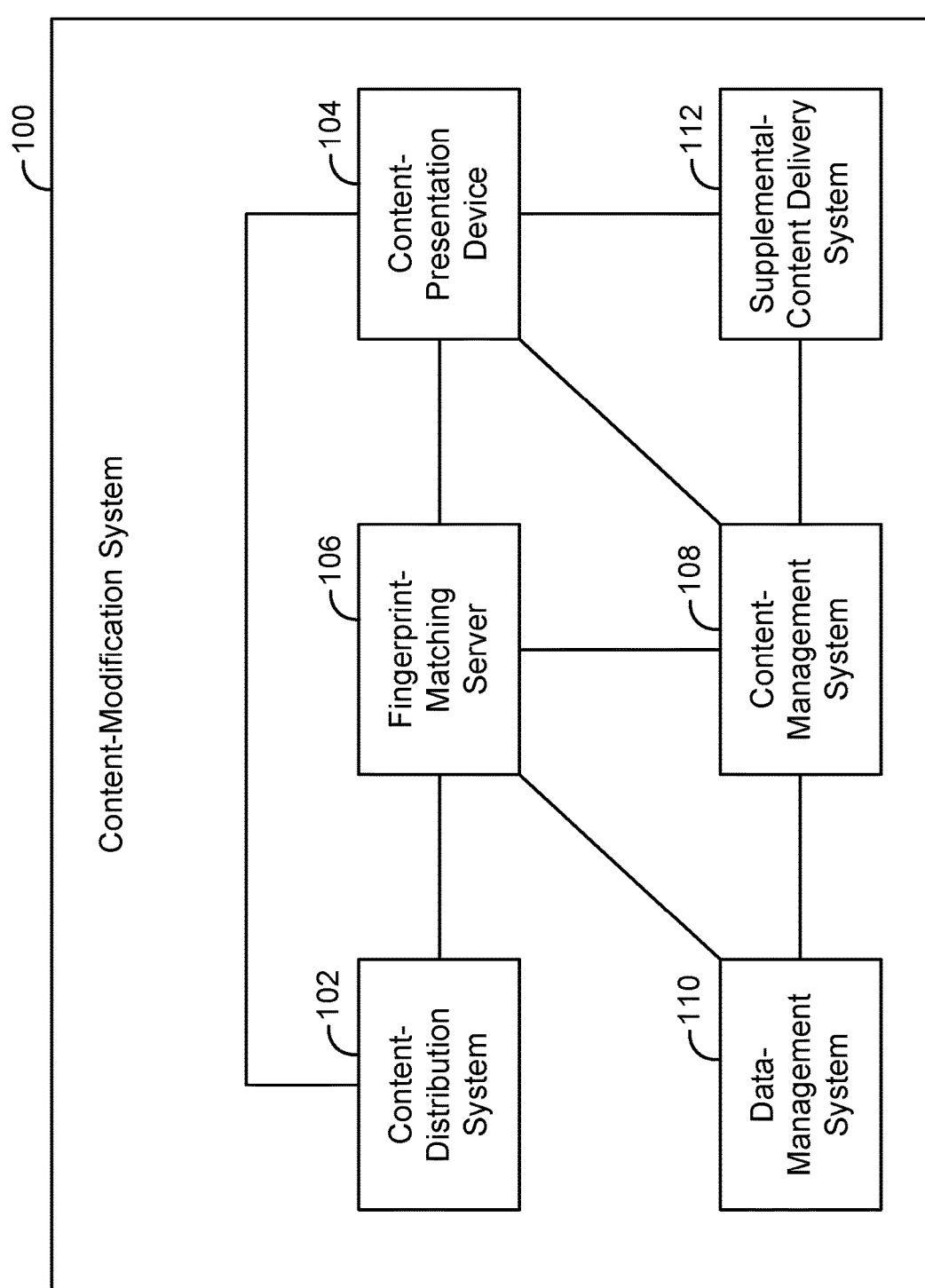
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users.

Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

To prepare for a scheduled content-replacement operation where the content-presentation device is scheduled to replace a given modifiable content-segment with alternative content, the content-presentation device can request and download the alternative content, such as an entire advertisement segment to replace another advertisement segment. Alternative content that is of higher video quality (e.g., 720p or 1080p) typically has a larger file size, and might thus take more time to request and download. By contrast, alternative content that is of lower video quality (e.g., below 720p, such as 480p) typically has a smaller file size, and might thus take less time to request and download.

Because of the amount of time it takes to request and download higher quality alternative content, there can be situations in which the content-presentation device might not be able to receive (e.g., download) higher-quality alternative content before the modification start-time at which the content-replacement operation begins (e.g., the start time of the modifiable content-segment being replaced). For example, if there is a very short delay between the content-distribution system's transmission of the content and the content-presentation device's receipt of the content, the content-presentation device might begin to output the received content before the alternative content is downloaded or before the content-presentation device is otherwise ready to initiate the replacement. As another example, even if there is not a very short delay, higher-quality alternative content might not be downloaded in time.

Thus, in many content-replacement situations, the content-presentation device and/or another computing system of the content-modification system may need to decide between requesting and downloading alternative content that has a larger file size and thus has a lower chance of being downloaded on time, or rather requesting and downloading alternative content that has a smaller file size and thus has a higher chance of being downloaded on time.

As for situations in which the content-presentation device is scheduled to overlay content on a given content segment, the modification start-time might not correspond to the start of the content segment, and thus, there might be more time to request and download the overlay content and content-presentation device might have more flexibility with performing content-modification operations. In addition, overlay content is typically smaller in file size, even for higher quality content, and thus the same type of decision described above with respect to content-replacement operations might not need to be made in content-overlay situations. However, there can still be situations in which the desired overlay content has a large file size and might not be downloaded in time for the scheduled content-overlay operation.

The present disclosure provides methods and systems that improve the content modification process for a content-modification system. In particular, the disclosed methods and systems can involve the content-presentation device requesting supplemental content (e.g., alternative content or overlay content) for use in performing a scheduled content-modification operation. In response to the request, a content-management system and/or other computing system of the content-modification system can select, and provide the content-presentation device with, first and second supplemental content, the first supplemental content being selected based on the first supplemental content having a first video quality that is higher than or equal to a predefined video quality threshold (e.g., 720p), and the second supplemental content being selected based on the second supplemental content having a second video quality that is lower than the predefined video quality threshold. The content-presentation device can download the first and second supplemental content into a first and second of the content-presentation device's buffers, respectively. Then, within a predefined time period before the modification start-time for the scheduled content-modification operation (e.g., a few seconds or less), the content-presentation device can check and determine whether the entirety of the first supplemental content has been downloaded. If so, the content-presentation device can carry out the content-modification operation using the first supplemental content, but if not, the content-presentation device can carry out the content-modification operation using the second supplemental content.

By having the option to preferably select higher quality supplemental content when such content is fully buffered and ready, and also having lower quality supplemental content ready as a backup in the event the higher quality supplemental content is not fully buffered, the content-modification system can increase the success rate of content-modification operations while maintaining a desirable degree of video quality. This also enables the content-modification system to quickly and desirably provide alternative content that is targeted to the end-user, even in circumstances that might otherwise have precluded the content-presentation device from being able to perform a content modification. As such, the operations of the disclosed methods and systems can also help reduce the amount of missed content-modification opportunities or prevent such missed opportunities altogether.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
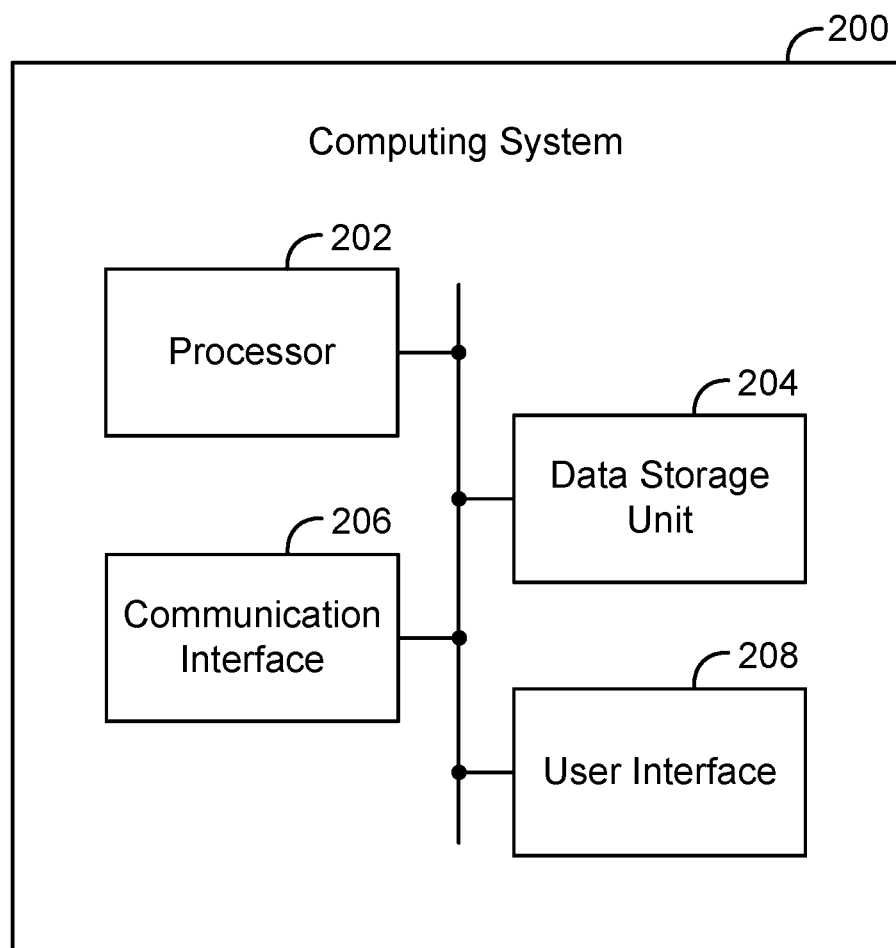
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
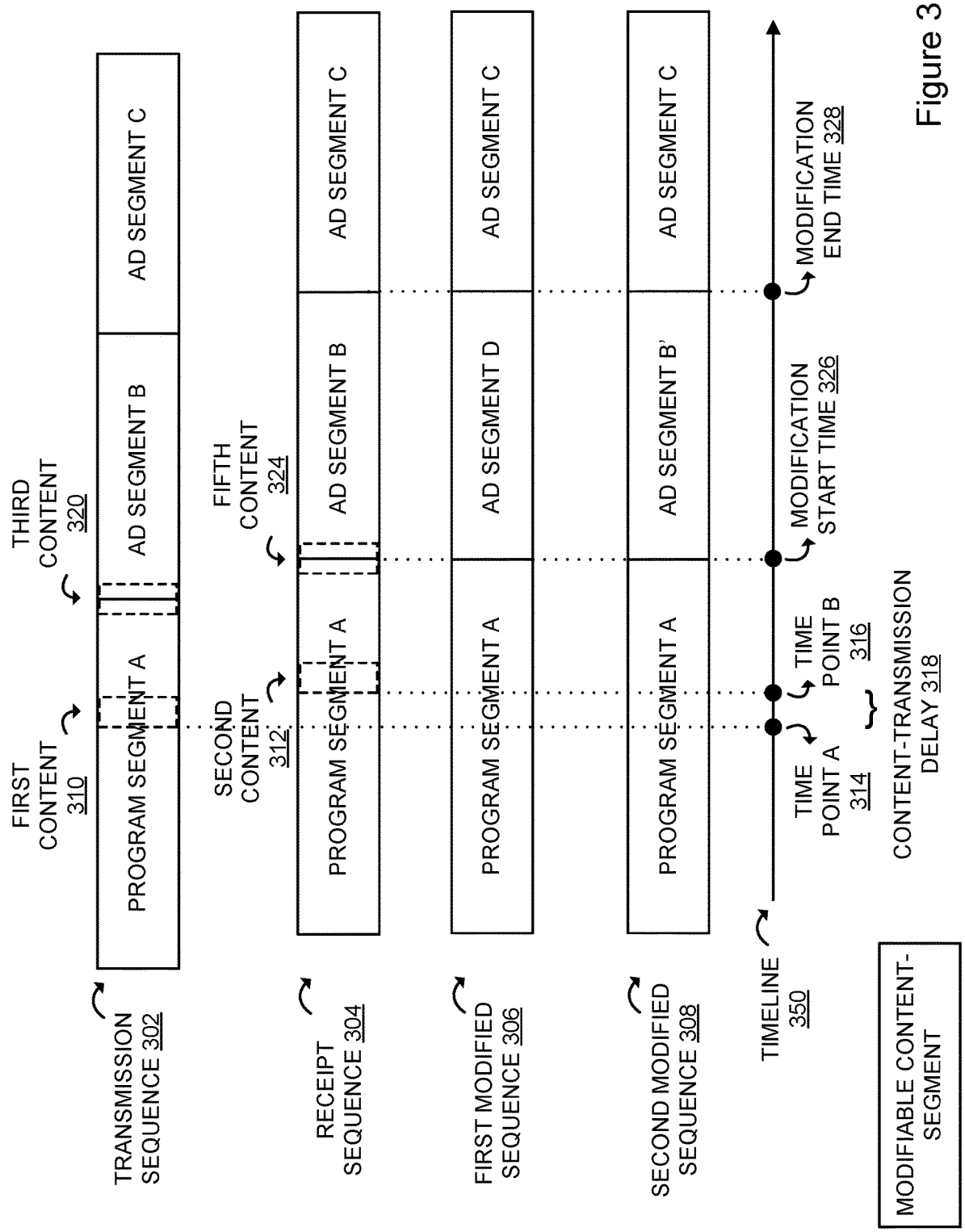
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Using Multiple Input Buffers of a Content-Presentation Device to Store Supplemental Content for a Content-Modification Operation In line with the discussion above, the disclosed methods and systems can advantageously increase the success rate of content-modification operations being performed (especially content-replacement operations), and can advantageously help increase the likelihood that such content-modification operations are performed with higher-quality supplemental content, thus improving user experience.

Examples of the disclosed features and related features will now be described. Although example operations will be described herein primarily as being performed by the content-presentation device 104 and the content-management system 108, other entities of the content-modification system 100, such as the fingerprint-matching server 106, could perform one or more of such operations in alternative embodiments.

As noted above, the content-presentation device 104 can transmit, to the content-management system 108, a request for supplemental content for use in connection with performing the content-modification operation at the modification start-time. The request can include selection criteria for the supplemental content, such as a specification for a particular requested type, duration, aspect ratio, and/or resolution of content.

The content-management system 108 can receive the request and use it as a basis to select supplemental content from among multiple supplemental content items that are available for selection. In particular, the content-management system 108 can use selection criteria specified in the request and/or other criteria in order to select both (i) first supplemental content having a first video quality that is higher than or equal to a predefined video quality threshold and (ii) second supplemental content having a second video quality that is lower than the predefined video quality threshold. That is, in response to receiving the request, the content-management system 108 can select the first supplemental content based at least in part on a determination (e.g., by the content-management system 108 and/or by another computing system) that the first supplemental content is of a first video quality that is higher than or equal to the predefined video quality threshold, and can select the second supplemental content based at least in part on a determination (e.g., by the content-management system 108 and/or by another computing system) that the second supplemental content is of a second video quality that is lower than the predefined video quality threshold.

In some examples, the predefined video quality threshold can be a threshold display resolution. For instance, the first supplemental content can be selected based on it having a first video quality of 720p or higher (e.g., 1080p or 4K), and the second supplemental content can be selected based on it having a second video quality that is lower than 720p (e.g., 480p). In other examples, the content-management system 108 can select the first and second supplemental content based on other criteria, separate from or in combination with a display resolution threshold. Such criteria can be a file size, duration, and/or aspect ratio, for example. As a more particular example, in a situation where the first and second supplemental content are each 30 seconds in length, the content-management system 108 can be configured to select the first supplemental content based at least in part on a determination that the first supplemental content (i) has at least a 720p resolution and (ii) has a file size of at least 10 megabytes (MB). Likewise, the content-management system 108 can be configured to select the second supplemental content based at least in part on a determination that the second supplemental content (i) is less than 720p resolution and (ii) has a file size lower than 3 MB.

In situations where supplemental content equal to or higher than the predefined video quality threshold is not available, the content-management system 108 can be configured to lower the predefined video quality threshold or not use the predefined video quality threshold, instead selecting first supplemental content and second supplemental content where the first supplemental content has a higher video quality or other higher parameter (e.g., file size) than the second supplemental content.

In alternative examples, the second supplemental content can be selected based on the second supplemental content having a second video quality that is lower than the first video quality, regardless of whether the second video quality is higher, lower, or equal to the predefined video quality threshold.

As noted above, the content-modification operation that the content-presentation device is scheduled to perform can be a content-replacement operation or a content-overlay operation, and thus the first and second supplemental content can either both be alternative content for replacing the modifiable content-segment (e.g., a replacement advertisement) or both be overlay content for overlaying over the modifiable content-segment.

In some examples, the first and second supplemental content can be the same supplemental content. For instance, the first and second supplemental content can be two versions of the same replacement advertisement, such as a 1080p version and a 480p version of the same replacement advertisement, respectively.

In other examples, the first and second supplemental content can be different supplemental content. For instance, there might be a situation in which an advertisement provider has only provided one version of a replacement advertisement and prohibits the content-modification system 100 from generating a higher or lower quality version of the replacement advertisement. In such a situation, the content-management system 108 can be configured to select the replacement advertisement and then select a backup replacement advertisement, different from the replacement advertisement. As an example, if the content-management system 108 determines that the replacement advertisement is lower than the predefined video quality threshold, the content-management system 108 can responsively select the backup replacement advertisement to be a replacement advertisement having a higher video quality than the replacement advertisement. Whereas, if the content-management system 108 determines that the replacement advertisement is higher than or equal to the predefined video quality threshold, the content-management system 108 can responsively select the backup replacement advertisement to be a replacement advertisement having a lower video quality than the replacement advertisement. Other examples are possible as well.

The content-management system, 108 can use a variety of information as a basis for selecting backup supplemental content such as a backup replacement advertisement, including but not limited to video quality, duration, file size, historical content consumption data and/or demographic data.

Upon selecting the first and second supplemental content, the content-management system 108 can cause the first and second supplemental content to be transmitted to a first and second input buffer, respectively, of the content-presentation device 104. The content-presentation device 104 can receive the first supplemental content into a first input buffer of the content-presentation device 104, and can receive the second supplemental content into a second input buffer of the content-presentation device 104.

As an example, and as described above, the content-management system 108 can transmit a request for (i) a first link pointing to the first supplemental content hosted by the supplemental-content delivery system 112 and (ii) a second link pointing to the second supplemental content hosted by the supplemental content delivery system 112, upon which the supplemental-content delivery system 112 can receive and respond to the request by transmitting the requested first and second links to the content-management system 108. The content-management system 108 can then transmit the first and second links to the content-presentation device 104, and the content-presentation device 104 can then in turn use the first and second links to retrieve (e.g., download) the first and second supplemental content into the first and second input buffer, respectively.

As another example, the content-management system 108 can retrieve files for the first and second supplemental content from the supplemental-content delivery system 112 and transmit the files to the content-presentation device 104. Other examples are possible as well.

Within a predefined time period before the modification start-time, the content-presentation device 104 can make a determination of whether an entirety of the first supplemental content has been received into the first input buffer. That is, the content-presentation device 104 checks to see if the higher quality supplemental content has downloaded. For example, the content-presentation device 104 can be configured to make the determination within two seconds, one second, or less than one second. In some examples, the content-presentation device 104 can make the determination at approximately the modification start-time.

Based on the determination of whether the entirety of the first supplemental content has been received into the first input buffer, the content-presentation device 104 can select supplemental content from a set of supplemental content that includes the first supplemental content and the second supplemental content and perform the content-modification operation (e.g., a content-replacement operation or content-overlay operation) by modifying (e.g., replacing or overlaying over) the modifiable content-segment using the selected supplemental content.

In particular, if the content-presentation device 104 determines that the entirety of the first supplemental content has been received into the first input buffer, the content-presentation device 104 can responsively perform the content-modification operation by modifying the modifiable content-segment using the first supplemental content instead of the second supplemental content. Whereas, if the content-presentation device 104 determines that less than the entirety of the first supplemental content has been received into the first input buffer, the content-presentation device 104 can responsively perform the content-modification operation by modifying the modifiable content-segment using the first supplemental content instead of the second supplemental content. Thus, if the higher-quality, first supplemental content has fully downloaded within the predefined time period before the modification start-time (or at exactly the modification start-time), the content-presentation device 104 can perform the content-modification operation using the first supplemental content.

In alternative examples, the content-presentation device 104 can make a determination of whether at least a threshold portion of the first supplemental content has been received into the first input buffer. The threshold portion can be set to be the entirety (e.g., 100%) of the total file size of the first supplemental content, or can be set to be less than the entirety. For instance, if 75% or more of the total file size of the first supplemental content (e.g., a 30 second advertisement) has been downloaded, the content-presentation device 104 can responsively begin performing the content-modification operation using the first supplemental content.

Additionally or alternatively to taking into account whether at least a threshold portion of the first supplemental content has been received into the first input buffer, the content-presentation device 104 can make a determination of how long it has taken to receive at least the threshold portion of the first supplemental content into the first input buffer. For example, if the content-presentation device 104 determines that 75% of the total file size of the first supplemental content (e.g., a 30 second advertisement) has taken less than or equal to a threshold time (e.g., 5 seconds or less) to download, the first supplemental content may be likely to complete downloading before being fully played out in accordance with the content-modification operation, and thus the content-presentation device 104 can responsively begin performing the content-modification operation using the first supplemental content. Whereas, if the content-presentation device 104 determines that 75% of the total file size of the first supplemental content (e.g., a 30 second advertisement) has taken greater than the threshold time to download (e.g., 5 minutes), the first supplemental content may be unlikely to complete downloading before being fully played out in accordance with the content-modification operation, and thus the content-presentation device 104 can responsively begin performing the content-modification operation using the second supplemental content instead. Other examples are possible as well.

In some examples, the first supplemental content and the second supplemental content can be received into the first and second input buffers substantially simultaneously (i.e., downloading both supplemental content at substantially the same time).

In other examples, however, the content-presentation device 104 can receive the second supplemental content into the second input buffer, and then the content-presentation device 104 can begin receiving (e.g., begin downloading) the first supplemental content into the first input buffer only after an entirety of, or at least a threshold percentage (e.g., 80%) of the total file size of, the second supplemental content has been received into the second input buffer. This can increase the likelihood of having the second supplemental content (i.e., the lower quality supplemental content) downloaded in time for performing the content-modification operation in scenarios where the content-presentation device's ability to download the first and second supplemental content is limited by the content-presentation device's outgoing, client-side bandwidth. Further, this can also decrease the likelihood of having the first supplemental content (i.e., the higher quality supplemental content) downloaded in time in situations where the content-management system 108 and/or supplemental-content delivery system 112 (e.g., servers that provide the supplemental content to the content-presentation device 104) have server-side bandwidth limitations.

Thus, in such examples, the content-presentation device 104 can determine the bandwidth of the server-side (e.g., the content-management system 108 and/or supplemental-content delivery system 112), such as by receiving an indication of the server-side bandwidth from the content-management system 108 and/or supplemental-content delivery system 112, and/or can determine its own, client-side bandwidth. Based at least in part on the server-side bandwidth and/or the client-side bandwidth, the content-presentation device 104 can select a download operation from a set of download operations that includes (i) a first download operation in which the content-presentation device receives the first supplemental content into the first input buffer at substantially the same time as the content-presentation device receives the second supplemental content into the second input buffer and (ii) a second download operation in which the content-presentation device receives an entirety of the second supplemental content into the second input buffer before receiving the first supplemental content into the first input buffer. The content-presentation device 104 can then receive the first and second supplemental content in accordance with the selected download operation. That is, the content-presentation device 104 can determine, based at least in part on the server-side bandwidth and/or the client-side bandwidth, whether to download the first and second supplemental content at substantially the same time or rather to download at least a portion of the second supplemental content before beginning to download the first supplemental content.

As a specific example, consider a situation in which the first supplemental content is 100 MB, the second supplemental content is 10 MB, and the maximum client-side bandwidth of the content-presentation device 104 is 10 MB/second. Table 1 illustrates how downloading in parallel or downloading in series can be preferable over one another depending on the server-side bandwidth and/or client-side bandwidth in this situation.

TABLE 1

|  | Server-side bandwidth: 100 MB/second | Server-side bandwidth: 1 MB/second |
| --- | --- | --- |
| Parallel download | Second supplemental content ready after 2 seconds, first supplemental content ready after 11 seconds | Second supplemental content ready after 10 seconds, first supplemental content ready after 100 seconds |
| Series download | Second supplemental content ready after 1 second, first supplemental content ready after 11 seconds | Second supplemental content ready after 10 seconds, first supplemental content ready after 110 seconds |

Thus, as shown in Table 1, when the server-side bandwidth is limited, downloading the first and second supplemental content in parallel can be more advantageous over downloading the first and second supplemental content in series because the first supplemental content is downloaded sooner, whereas when the client-side bandwidth is limited, downloading at least a portion of the second supplemental content before the first supplemental content can be more advantageous over downloading the first and second supplemental content in parallel because the second supplemental content is downloaded sooner. Other examples are possible as well.

Figure 5:
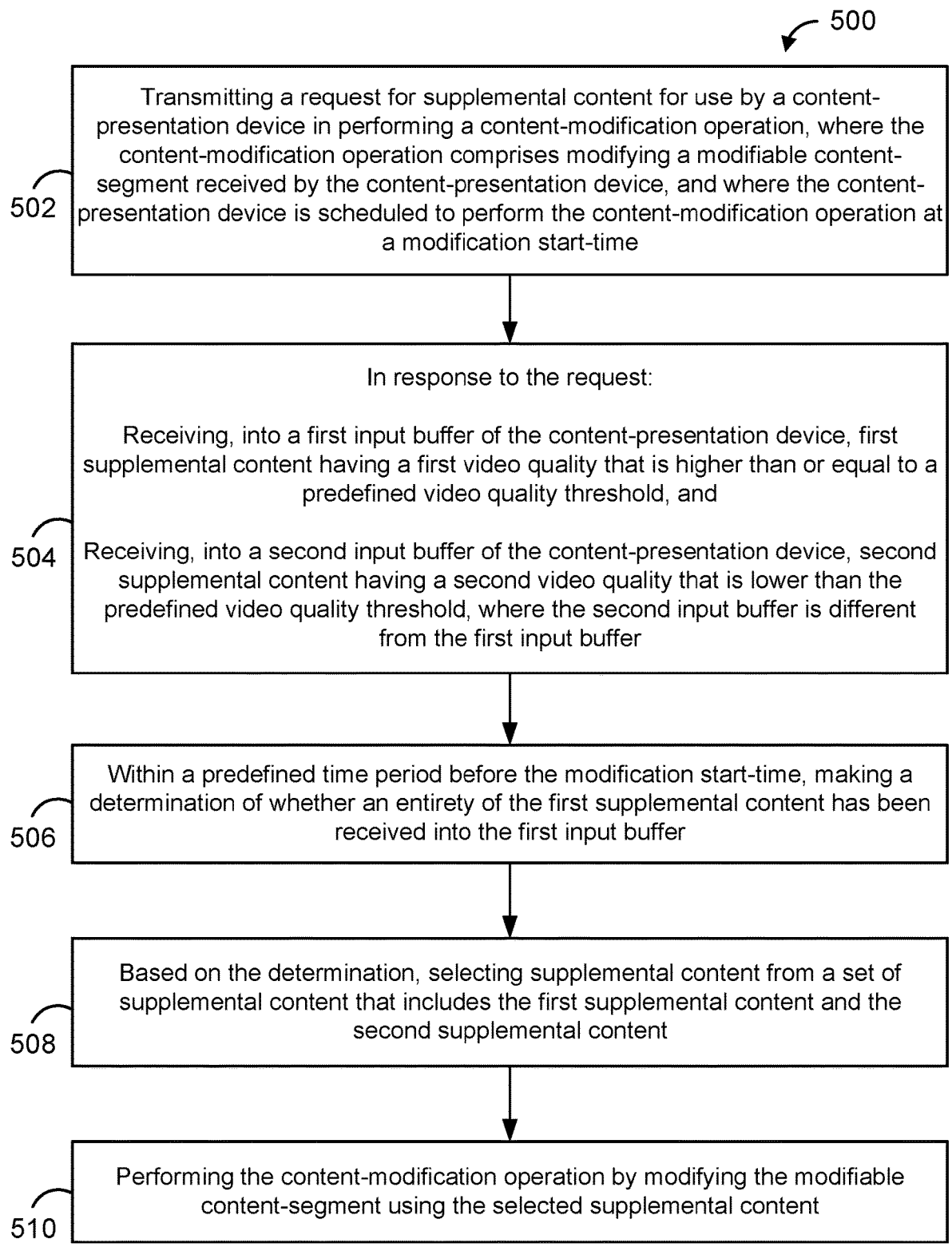
FIG. 5 is a flow chart of an example method.

FIG. 5 is a flow chart of an example method 500. At block 502, the method 500 includes transmitting a request for supplemental content for use by a content-presentation device in performing a content-modification operation, where the content-modification operation comprises modifying a modifiable content-segment received by the content-presentation device, and where the content-presentation device is scheduled to perform the content-modification operation at a modification start-time.

At block 504, the method 500 includes in response to the request: receiving, into a first input buffer of the content-presentation device, first supplemental content having a first video quality that is higher than or equal to a predefined video quality threshold, and receiving, into a second input buffer of the content-presentation device, second supplemental content having a second video quality that is lower than the predefined video quality threshold, where the second input buffer is different from the first input buffer.

At block 506, the method 500 includes within a predefined time period before the modification start-time, making a determination of whether an entirety of the first supplemental content has been received into the first input buffer.

At block 508, the method 500 includes based on the determination, selecting supplemental content from a set of supplemental content that includes the first supplemental content and the second supplemental content.

At block 510, the method 500 includes performing the content-modification operation by modifying the modifiable content-segment using the selected supplemental content.

In some embodiments, the act of making the determination of whether the entirety of the first supplemental content has been received into the first input buffer involves making a determination that the entirety of the first supplemental content has been received into the first input buffer, the act of selecting the supplemental content from the set of supplemental content based on the determination involves selecting the first supplemental content based on the determination, and the act of performing the content-modification operation by modifying the modifiable content-segment using the selected supplemental content involves performing the content-modification operation by modifying the modifiable content-segment using the selected first supplemental content.

In some embodiments, the act of making the determination of whether the entirety of the first supplemental content has been received into the first input buffer involves making a determination that less than the entirety of the first supplemental content has been received into the first input buffer, the act of selecting the supplemental content from the set of supplemental content based on the determination involves selecting the second supplemental content based on the determination, and the act of performing the content-modification operation by modifying the modifiable content-segment using the selected supplemental content involves performing the content-modification operation by modifying the modifiable content-segment using the selected second supplemental content.

In some embodiments, the first supplemental content and the second supplemental content are the same supplemental content.

In some embodiments, wherein the first supplemental content and the second supplemental content are different supplemental content.

In some embodiments, the content-modification operation is a content-replacement operation, and the act of performing the content-modification operation by modifying the modifiable content-segment using the selected supplemental content involves performing the content-replacement operation by replacing the modifiable content-segment with the selected supplemental content.

In some embodiments, the content-modification operation is a content-overlay operation, and the act of performing the content-modification operation by modifying the modifiable content-segment using the selected supplemental content involves performing the content-overlay operation by overlaying the selected supplemental content over the modifiable content-segment.

In some embodiments, the predefined video quality threshold is a 720p display resolution.

In some embodiments, the act of transmitting the request for supplemental content involves transmitting, to a computing system associated with delivery of supplemental content to the content-presentation device, a request for a link pointing to supplemental content. In such embodiments, the act of receiving the first supplemental content into the first input buffer and the second supplemental content into the second input buffer in response to the request involves in response to the request: receiving, from the computing system, a first link pointing to the first supplemental content and using the first link to download the first supplemental content from the computing system into the first input buffer, and receiving, from the computing system, a second link pointing to the second supplemental content and using the second link to download the second supplemental content from the computing system into the second input buffer.

In some embodiments, the method 500 also includes determining a client-side bandwidth associated with the content-presentation device, determining a server-side bandwidth associated with a computing system that is associated with delivery of supplemental content to the content-presentation device, and based on one or more of the client-side bandwidth and the server-side bandwidth, selecting a download operation from a set of download operations that includes (i) a first download operation in which the content-presentation device receives the first supplemental content into the first input buffer at substantially the same time as the content-presentation device receives the second supplemental content into the second input buffer and (ii) a second download operation in which the content-presentation device receives an entirety of the second supplemental content into the second input buffer before receiving the first supplemental content into the first input buffer. In such embodiments, the act of receiving the first supplemental content into the first input buffer involves receiving the first supplemental content into the first input buffer in accordance with the selected download operation, and the act of receiving the second supplemental content into the second input buffer involves receiving the second supplemental content into the second input buffer in accordance with the selected download operation.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:

transmitting a request for supplemental content for use by a content-presentation device in performing a content-modification operation, wherein the content-modification operation comprises modifying a modifiable content-segment received by the content-presentation device, and wherein the content-presentation device is scheduled to perform the content-modification operation at a scheduled modification start-time;

in response to the request:

receiving, into a first input buffer of the content-presentation device, first supplemental content having a first video quality that is higher than or equal to a predefined video quality threshold, and receiving, into a second input buffer of the content-presentation device, second supplemental content having a second video quality that is lower than the predefined video quality threshold, wherein the second input buffer is different from the first input buffer;
determining that there is less than a predefined time period before the modification start-time;
in response to determining that there is less than the predefined time period before the modification start-time, making a determination of whether at least a threshold portion of the first supplemental content has been received into the first input buffer; and
in response to making the determination:
selecting supplemental content from a set of supplemental content that includes the first supplemental content and the second supplemental content; and
performing the content-modification operation by modifying the modifiable content-segment using the selected supplemental content.

2. The method of claim 1, wherein making the determination of whether at least the threshold portion of the first supplemental content has been received into the first input buffer comprises making a determination that an entirety of the first supplemental content has been received into the first input buffer,
wherein selecting the supplemental content from the set of supplemental content based on the determination comprises selecting the first supplemental content based on the determination, and
wherein performing the content-modification operation by modifying the modifiable content-segment using the selected supplemental content comprises performing the content-modification operation by modifying the modifiable content-segment using the selected first supplemental content.

3. The method of claim 1, wherein making the determination of whether at least the threshold portion of the first supplemental content has been received into the first input buffer comprises making a determination that less than the threshold portion of the first supplemental content has been received into the first input buffer,
wherein selecting the supplemental content from the set of supplemental content based on the determination comprises selecting the second supplemental content based on the determination, and
wherein performing the content-modification operation by modifying the modifiable content-segment using the selected supplemental content comprises performing the content-modification operation by modifying the modifiable content-segment using the selected second supplemental content.

4. The method of claim 1, wherein the first supplemental content and the second supplemental content are the same supplemental content.

5. The method of claim 1, wherein the first supplemental content and the second supplemental content are different supplemental content.

6. The method of claim 1, wherein the content-modification operation is a content-replacement operation, and
wherein performing the content-modification operation by modifying the modifiable content-segment using the selected supplemental content comprises performing the content-replacement operation by replacing the modifiable content-segment with the selected supplemental content.

7. The method of claim 1, wherein the content-modification operation is a content-overlay operation, and
wherein performing the content-modification operation by modifying the modifiable content-segment using the selected supplemental content comprises performing the content-overlay operation by overlaying the selected supplemental content over the modifiable content-segment.

8. The method of claim 1, wherein the predefined video quality threshold is a 720p display resolution.

9. The method of claim 1, wherein transmitting the request for supplemental content comprises transmitting, to a computing system associated with delivery of supplemental content to the content-presentation device, a request for a link pointing to supplemental content, and
wherein receiving the first supplemental content into the first input buffer and the second supplemental content into the second input buffer in response to the request comprises:
receiving, from the computing system, a first link pointing to the first supplemental content and using the first link to download the first supplemental content from the computing system into the first input buffer, and
receiving, from the computing system, a second link pointing to the second supplemental content and using the second link to download the second supplemental content from the computing system into the second input buffer.

10. The method of claim 1, further comprising:
determining a client-side bandwidth associated with the content-presentation device;
determining a server-side bandwidth associated with a computing system that is associated with delivery of supplemental content to the content-presentation device; and
based on one or more of the client-side bandwidth and the server-side bandwidth, selecting a download operation from a set of download operations that includes (i) a first download operation in which the content-presentation device receives the first supplemental content into the first input buffer at substantially the same time as the content-presentation device receives the second supplemental content into the second input buffer and (ii) a second download operation in which the content-presentation device receives an entirety of the second supplemental content into the second input buffer before receiving the first supplemental content into the first input buffer,
wherein receiving the first supplemental content into the first input buffer comprises receiving the first supplemental content into the first input buffer in accordance with the selected download operation, and
wherein receiving the second supplemental content into the second input buffer comprises receiving the second supplemental content into the second input buffer in accordance with the selected download operation.

11. A non-transitory computer-readable storage medium, having stored thereon program instructions that, upon execution by a processor, cause performance of a set of operations comprising:
transmitting a request for supplemental content for use by a content-presentation device in performing a content-modification operation, wherein the content-modification operation comprises modifying a modifiable content-segment received by the content-presentation device, and wherein the content-presentation device is scheduled to perform the content-modification operation at a scheduled modification start-time;

in response to the request:
receiving, into a first input buffer of the content-presentation device, first supplemental content having a first video quality that is higher than or equal to a predefined video quality threshold, and
receiving, into a second input buffer of the content-presentation device, second supplemental content having a second video quality that is lower than the predefined video quality threshold, wherein the second input buffer is different from the first input buffer;
determining that there is less than a predefined time period before the modification start-time;
in response to determining that there is less than the predefined time period before the modification start-time, making a determination of whether at least a threshold portion of the first supplemental content has been received into the first input buffer; and
in response to making the determination:
selecting supplemental content from a set of supplemental content that includes the first supplemental content and the second supplemental content; and
performing the content-modification operation by modifying the modifiable content-segment using the selected supplemental content.

12. The non-transitory computer-readable storage medium of claim 11, wherein making the determination of whether at least the threshold portion of the first supplemental content has been received into the first input buffer comprises making a determination that an entirety of the first supplemental content has been received into the first input buffer,
wherein selecting the supplemental content from the set of supplemental content based on the determination comprises selecting the first supplemental content based on the determination, and
wherein performing the content-modification operation by modifying the modifiable content-segment using the selected supplemental content comprises performing the content-modification operation by modifying the modifiable content-segment using the selected first supplemental content.

13. The non-transitory computer-readable storage medium of claim 11, wherein making the determination of whether at least the threshold portion of the first supplemental content has been received into the first input buffer comprises making a determination that less than the threshold portion of the first supplemental content has been received into the first input buffer,
wherein selecting the supplemental content from the set of supplemental content based on the determination comprises selecting the second supplemental content based on the determination, and
wherein performing the content-modification operation by modifying the modifiable content-segment using the selected supplemental content comprises performing the content-modification operation by modifying the modifiable content-segment using the selected second supplemental content.

14. The non-transitory computer-readable storage medium of claim 11, wherein the first supplemental content and the second supplemental content are the same supplemental content.

15. The non-transitory computer-readable storage medium of claim 11, wherein the first supplemental content and the second supplemental content are different supplemental content.

16. The non-transitory computer-readable storage medium of claim 11, wherein the content-modification operation is a content-replacement operation, and
wherein performing the content-modification operation by modifying the modifiable content-segment using the selected supplemental content comprises performing the content-replacement operation by replacing the modifiable content-segment with the selected supplemental content.

17. The non-transitory computer-readable storage medium of claim 11, wherein the content-modification operation is a content-overlay operation, and
wherein performing the content-modification operation by modifying the modifiable content-segment using the selected supplemental content comprises performing the content-overlay operation by overlaying the selected supplemental content over the modifiable content-segment.

18. The non-transitory computer-readable storage medium of claim 11, wherein the predefined video quality threshold is a 720p display resolution.

19. The non-transitory computer-readable storage medium of claim 11, the set of operations further comprising:
determining a client-side bandwidth associated with the content-presentation device;
determining a server-side bandwidth associated with a computing system that is associated with delivery of supplemental content to the content-presentation device; and
based on one or more of the client-side bandwidth and the server-side bandwidth, selecting a download operation from a set of download operations that includes (i) a first download operation in which the content-presentation device receives the first supplemental content into the first input buffer at substantially the same time as the content-presentation device receives the second supplemental content into the second input buffer and (ii) a second download operation in which the content-presentation device receives an entirety of the second supplemental content into the second input buffer before receiving the first supplemental content into the first input buffer,
wherein receiving the first supplemental content into the first input buffer comprises receiving the first supplemental content into the first input buffer in accordance with the selected download operation, and
wherein receiving the second supplemental content into the second input buffer comprises receiving the second supplemental content into the second input buffer in accordance with the selected download operation.

20. A computing system comprising:
a processor; and
a non-transitory computer-readable storage medium, having stored thereon program instructions that, upon execution by the processor, cause performance of a set of operations comprising:
transmitting a request for supplemental content for use by a content-presentation device in performing a content-modification operation, wherein the content-modification operation comprises modifying a modifiable content-segment received by the content-presentation device, and wherein the content-presentation device is scheduled to perform the content-modification operation at a scheduled modification start-time;

in response to the request:
- receiving, into a first input buffer of the content-presentation device, first supplemental content having a first video quality that is higher than or equal to a predefined video quality threshold, and
- receiving, into a second input buffer of the content-presentation device, second supplemental content having a second video quality that is lower than the predefined video quality threshold, wherein the second input buffer is different from the first input buffer;

determining that there is less than a predefined time period before the modification start-time;

in response to determining that there is less than the predefined time period before the modification start-time, making a determination of whether at least a threshold portion of the first supplemental content has been received into the first input buffer; and in response to making the determination:
- selecting supplemental content from a set of supplemental content that includes the first supplemental content and the second supplemental content; and
- performing the content-modification operation by modifying the modifiable content-segment using the selected supplemental content.

* * * * *